United States Patent
Cremona et al.

(10) Patent No.: US 10,767,717 B2
(45) Date of Patent: Sep. 8, 2020

(54) METHOD FOR USING BRAKE PAD INFORMATION IN BRAKING APPLICATIONS

(71) Applicant: Bendix Commercial Vehicle Systems LLC, Elyria, OH (US)

(72) Inventors: Michael D Cremona, Lakewood, OH (US); Thomas J Hayes, Lakewood, OH (US); Daniel P Zula, North Ridgeville, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 16/051,613

(22) Filed: Aug. 1, 2018

(65) Prior Publication Data
US 2020/0040956 A1 Feb. 6, 2020

(51) Int. Cl.
*B60Q 1/00* (2006.01)
*F16D 66/02* (2006.01)
(Continued)

(52) U.S. Cl.
CPC .......... *F16D 66/027* (2013.01); *B62D 9/007* (2013.01); *F16D 65/092* (2013.01)

(58) Field of Classification Search
CPC ............... F16D 66/027; F16D 65/092; F16D 2066/001; F16D 2500/7104; B62D 9/007;
(Continued)

(56) References Cited

U.S. PATENT DOCUMENTS 4,790,606 A * 12/1988 Reinecke .................. B60T 8/00
188/1.11 E
4,971,179 A 11/1990 Gebhardt
(Continued)

FOREIGN PATENT DOCUMENTS

DE 10216871 A1 10/2003
EP 0189082 A2 7/1986
(Continued)

OTHER PUBLICATIONS

European Patent Office, "Search report and written opinion of the International Searching Authority," Report, Oct. 8, 2019, 12 pages, European Patent Office, Munich Germany.

*Primary Examiner* — Anh V La
(74) *Attorney, Agent, or Firm* — Cheryl Greenly; Brian Kondas; Eugene Clair (57) ABSTRACT

A method for modifying a brake application of a combination vehicle comprises receiving a temperature signal of a first brake pad of a first brake assembly and receiving a temperature signal representative of a temperature of a second brake pad of a second brake assembly. The temperatures are compared to a first predetermined temperature. The method will determine if service brakes of the trailer are being applied by a driver and compare a wheel speed of the trailer with the wheel speed of a tractor of the combination vehicle. The method will determine a brake drag exists on the trailer in response to both the first and the second brake pad temperature being greater than the first predetermined temperature, the trailer wheel speed being less than the tractor wheel speed and the service brakes not being applied by the driver.

13 Claims, 4 Drawing Sheets

(51) Int. Cl.
*B62D 9/00* (2006.01)
*F16D 65/092* (2006.01)

(58) Field of Classification Search
CPC ........ B60T 17/22; B60T 17/221; B60T 17/18; B60T 8/1708; B60T 8/885; B60T 2270/406; B60T 2270/413; B60W 10/184; B60W 10/18; B60W 30/18109
USPC .............. 340/453, 431, 425.5, 438, 454, 452
See application file for complete search history.

(56) References Cited

U.S. PATENT DOCUMENTS

| | | | |
|---|---|---|---|
| 5,184,875 | A | 2/1993 | Wrede |
| 5,524,974 | A * | 6/1996 | Fischle ............... B60T 17/22 188/1.11 R |
| 6,680,672 | B2 | 1/2004 | Borugian |
| 6,934,618 | B2 | 8/2005 | Eckert |
| 7,694,555 | B2 | 4/2010 | Howell |
| 8,706,358 | B2 | 4/2014 | DeWitt |
| 8,717,159 | B2 | 5/2014 | Todd |
| 8,798,846 | B2 | 8/2014 | Takahashi |
| 9,610,931 | B2 | 4/2017 | O'Meachair |
| 9,718,449 | B2 | 8/2017 | Newberry |
| 2002/0104717 | A1 * | 8/2002 | Borugian ............... B60T 17/221 188/1.11 E |
| 2007/0194623 | A1 | 8/2007 | Miyazaki |
| 2007/0216222 | A1 | 9/2007 | Miyazaki |
| 2010/0250028 | A1 | 9/2010 | DeVlieg |
| 2015/0027823 | A1 * | 1/2015 | Murata ............... F16D 65/14 188/162 |
| 2016/0138665 | A1 * | 5/2016 | Antanaitis ............. F16D 66/026 701/70 |
| 2016/0272179 | A1 | 9/2016 | Eberling |
| 2017/0340908 | A1 | 11/2017 | Heath |
| 2018/0037210 | A1 * | 2/2018 | Hecker ................. B60T 17/18 |

FOREIGN PATENT DOCUMENTS

| | | |
|---|---|---|
| EP | 1359077 A1 | 11/2003 |
| EP | 2570312 A1 | 3/2013 |
| WO | WO03029061 A1 | 4/2003 |
| WO | WO2015074027 A1 | 5/2015 |

* cited by examiner

METHOD FOR USING BRAKE PAD INFORMATION IN BRAKING APPLICATIONS

BACKGROUND

The present invention relates to embodiments of an apparatus and method for using brake pad temperature information to modify braking applications. Commercial vehicle brake friction material reaches different temperatures depending on the route driven, the terrain of the route, the condition of the braking assembly and the brake application frequency. The state of the friction material affects the braking ability of the commercial vehicle. Therefore, there is a need for a method to use brake pad temperature information to improve brake application and lengthen brake pad useful life in commercial vehicles.

SUMMARY

Various embodiments of a system for determining a brake application based on brake pad temperature information are disclosed. The system comprises a first brake pad temperature sensor for transmitting temperature signals, the first brake pad temperature sensor measuring a temperature of a brake pad associated with a first wheel end; a second brake pad temperature sensor for transmitting temperature signals, the second brake pad temperature sensor measuring a temperature of a brake pad associated with a second wheel end; a first brake control device associated with the first wheel end; a second brake control device associated with the second wheel end; and a controller for receiving the temperature signals and transmitting a brake control signal, wherein the brake control signal is modified based on the temperature signals.

Various methods for modifying a brake application on a trailer of a combination vehicle are disclosed. One method for modifying a brake application on a trailer of a combination vehicle comprises receiving a temperature signal representative of a temperature value of a first brake pad associated with a first brake assembly on a first axle of a trailer and receiving a temperature signal representative of a temperature value of a second brake pad associated with a second brake assembly on the first axle of the trailer. The method includes comparing the first and second brake pad temperature values to a predetermined first temperature threshold, then determining if service brakes of the trailer are being applied by a driver. The method includes comparing a wheel speed of the trailer with the wheel speed of a tractor of the combination vehicle. The method includes determining a brake drag exists on the trailer in response to both the first and the second brake pad temperature being greater than the first temperature threshold, the trailer wheel speed being less than the tractor wheel speed and the service brakes not being applied by the driver. The method includes transmitting an alert signal to alert the driver to the presence of brake drag.

Another method for modifying a brake application comprises receiving a temperature signal indicating a temperature value of at least one brake pad associated with at least one brake assembly. The method includes comparing the temperature of one of the at least one brake pad to a predetermined first temperature value and determining the at least one brake assembly is locked in response to the brake pad temperature being above the first temperature threshold while the other of the at least one brake pad temperature signals remain lower than the first temperature threshold.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
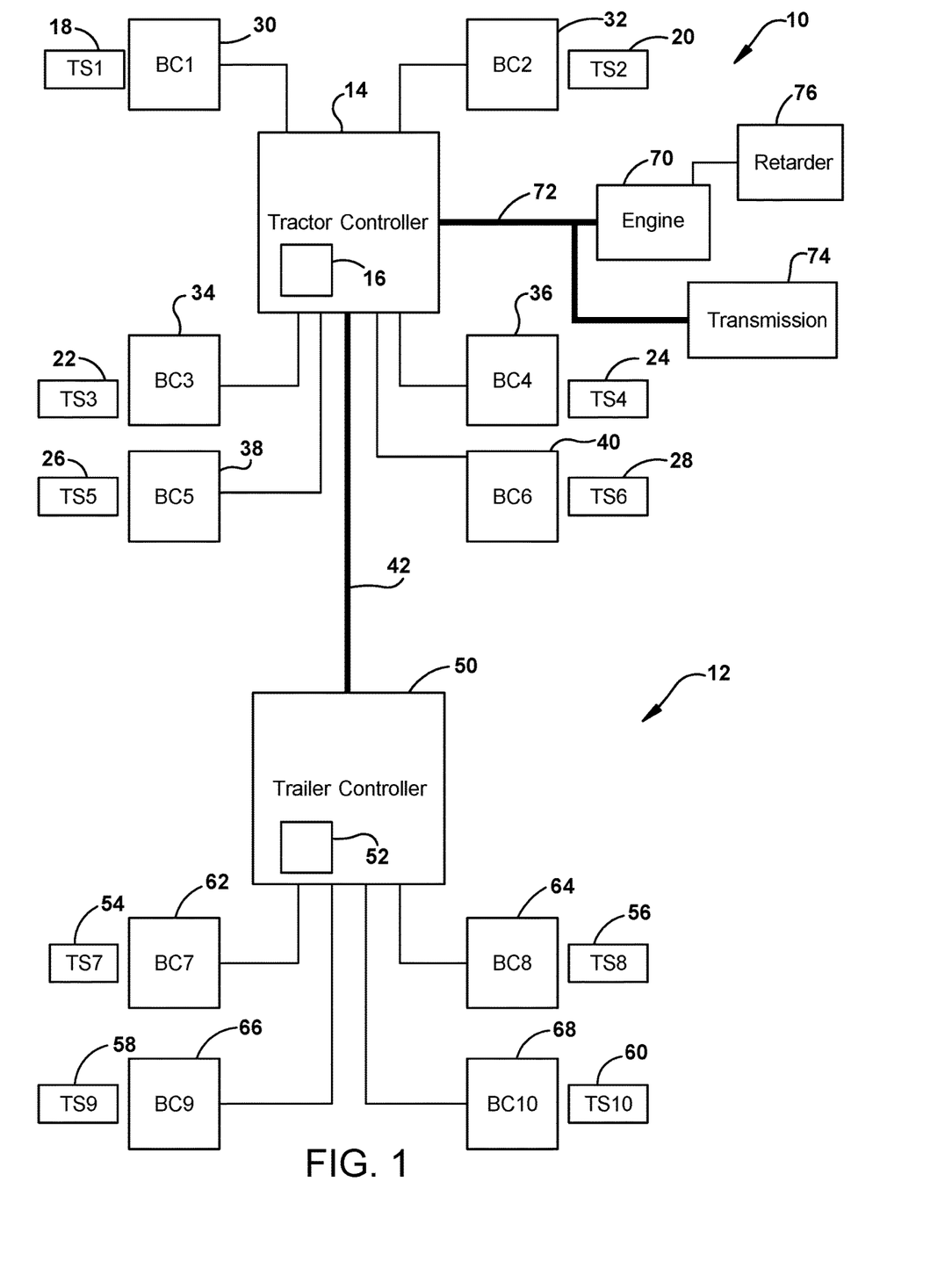
FIG. 1 illustrates a commercial vehicle equipped with the braking systems and brake pad temperature measurement systems of the present invention.

FIG. 1 illustrates a tractor brake system 10 of a commercial vehicle having a brake pad temperature analysis system according to one example of the present invention. FIG. 1 also illustrates a trailer brake system 12 of the commercial vehicle having a brake pad temperature analysis system.

The tractor system 10 includes a tractor controller 14. The tractor controller 14 includes a processor with control logic 16 for receiving and transmitting signals. The control logic 16 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 16.

The tractor controller 14 receives signals from various temperature sensors on the tractor. For example, temperature sensors 18 (TS1), 20 (TS2), 22 (TS3), 24 (TS4), 26 (TS5), 28 (TS6) are located proximate to a brake assembly, internal to a braking component or within the brake pad for each wheel end on the tractor. The temperature sensors TS1-TS6 may transmit temperature information through wires to the tractor controller 14 or may transmit wirelessly. The temperature sensors TS1-TS6 may be thermocouples, thermistors, camera based thermal imaging or other means of collecting temperature information from in and around a brake pad. The control logic 16 receives the temperature sensor information.

The tractor controller 14 transmits brake control signals to brake control devices 30 (BC1), 32 (BC2), 34 (BC3), 36 (BC4), 38 (BC5), 40 (BC6) to control the braking of the tractor. BC1-BC6 may receive the brake control signals through wires or wirelessly. Braking begins with either a driver requested braking event or through an automated braking request received by the braking controller 14. The braking action may be modified by the control logic 16 based on the temperature sensor information from TS1-TS6.

The tractor controller 14 communicates with an engine controller 70 via a vehicle serial communications bus 72. The engine controller 70 may control a retarder function and/or engine braking. Alternatively, the tractor controller 14 may communicate directly with a retarder 76 via the communications bus 72. The retarder 76 assists in slowing the vehicle by changing the engine operation in response to deceleration messages. The tractor controller 14 also communicates with a transmission controller 74 via the vehicle serial communications bus 72. The transmission controller 74 controls the shifting of the automatic or semi-automatic transmission.

The tractor controller 14 communicates with a trailer controller 50 via a tractor-trailer communications line 42. The communications line 42 may use SAE J1939, SAE J2497 PLC or LIN protocols. Alternatively, the tractor controller 14 and trailer controller 50 may communicate wirelessly. Digital wireless communication protocols may include WiFi, Bluetooth and Near Field Communications.

The trailer controller 50 of trailer braking system 12 includes a processor with control logic 52 for receiving and transmitting signals. The control logic 52 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 52.

The trailer controller 50 receives signals from various temperature sensors on the trailer. For example, temperature sensors 54 (TS7), 56 (TS8), 58 (TS9), 60 (TS10) are located proximate to a brake assembly, internal to a braking component or within the brake pad for each wheel end on the trailer. The temperature sensors TS7-TS10 may transmit temperature information through wires to the trailer controller 50 or may transmit wirelessly. The temperature sensors TS7-TS10 may be thermocouples, thermistors, camera based thermal imaging or other means of collecting temperature information from in and around a brake pad. In trailers with multiple axles or applications with multiple trailers, additional temperatures sensors may be installed. The control logic 52 receives the temperature sensor information from TS7-TS10.

The trailer controller 50 transmits brake control signals to brake control devices 62 (BC7), 64 (BC8), 66 (BC9), 68 (BC10) to control braking of the trailer. BC7-BC10 may receive brake control signals through wires or wirelessly. Braking begins with either a driver requested braking event as transmitted pneumatically or electrically to the trailer braking system 12 or by an automated braking request received by the trailer controller 50 via the communications line 42. The braking action may be modified by the control logic 52 based on the temperature sensor information.

Therefore, a system for determining a brake application comprises a first brake pad temperature sensor for transmitting temperature signals, the first brake pad temperature sensor measuring a temperature of a brake pad associated with a first wheel end; a second brake pad temperature sensor for transmitting temperature signals, the second brake pad temperature sensor measuring a temperature of a brake pad associated with a second wheel end; a first brake control device associated with the first wheel end; a second brake control device associated with the second wheel end; and a controller for receiving the temperature signals and transmitting a brake control signal, wherein the brake control signal is modified based on the temperature signals.

Figure 2:
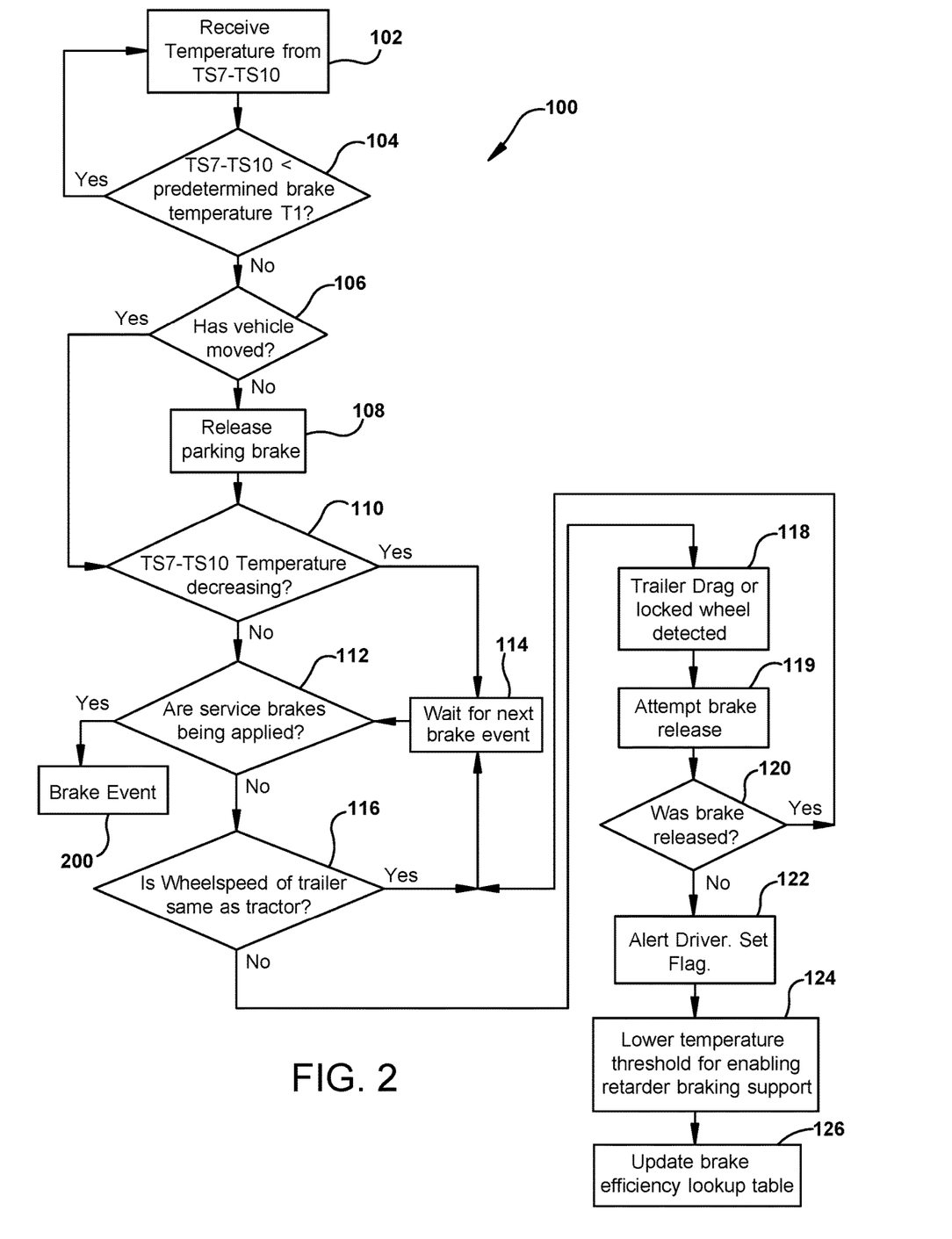
FIG. 2 illustrates a method of determining brake drag according to one example of the present invention.

FIG. 2 illustrates a method for determining brake drag on a trailer using the temperature sensor information, according to one example of the invention. The method 100 begins with receiving the temperature from all of the temperature sensors TS7-TS10 of the trailer braking system 12 in step 102. For this example, the temperature values from temperature sensors TS7-TS10 of the trailer are part of the temperature signals received by the trailer controller 50. The trailer control logic 52 compares the signal of each of the temperature sensors TS7-TS10 to a predetermined first temperature threshold T1 in step 104. If all of the temperature values received are less than the first temperature threshold T1, the method 100 returns to step 102 to continue to receive the temperature signals from each of the temperature sensors.

If any or all of the temperature signals from TS7-TS10 are equal to or greater than the first temperature threshold T1, the method 100 proceeds to step 106. In one example, the first temperature threshold T1 is initially set at about 400 degrees Fahrenheit. This 400 F value is selected as a temperature value that is above what is considered a normal operating temperature for a commercial vehicle brake pad. In an example drum brake assembly, a predetermined second temperature threshold T2 may be set at a value where brake fade has been determined to begin. Fading occurs when the brake drum has expanded such that the friction material may no longer be engaging the brake drum. T2 may be set at about 600 F. In an example disc brake assembly, a predetermined third temperature threshold T3 may be set at a value at which glazing of the brake pad may begin. The third temperature threshold T3 may be set at about 1100 F. Glazing is caused when the brake pad friction material is overheated. Glazing results in crystallized friction material on the pad surface and the brake disc. Typical symptoms of glazed brake pads or brake fade include poor stopping performance, vibration or brake shudder, and cracks or fissures in the brake pad material. The method 100 may alert the driver to these potential conditions through an audible or visual means. The method 100 attempts to avoid the effects of brake pads being held at or above these temperatures for long periods of time, as will be explained.

In step 106, the trailer control logic 52 determines if the trailer has moved. The trailer control logic 52 may determine movement from the reading of wheel speed sensors or other technology on the trailer. If the trailer has not moved, as determined by the wheel speed sensors generating zero speed for example, then the trailer control logic 52 attempts to release the parking brakes on the trailer in step 108. In some situations, the parking brakes may have failed to have been released by the driver before trying to move the trailer. Dragging parking brakes can cause the temperature sensors TS7-TS10 to capture elevated readings. Once the parking brakes are released, the temperature data is received again by control logic 52 in step 110 to determine if the temperature is decreasing.

If the trailer had moved in step 106 based on the wheel speed sensors reading greater than zero speed for example, the method 100 proceeds directly to step 110.

The method 100 then determines in step 110 if the temperature values received from sensors TS7-TS10 are decreasing from the previously measured values. If the temperature of all the sensors TS7-TS10 is decreasing, the method 100 moves to step 114 to wait for the next brake event.

Figure 3:
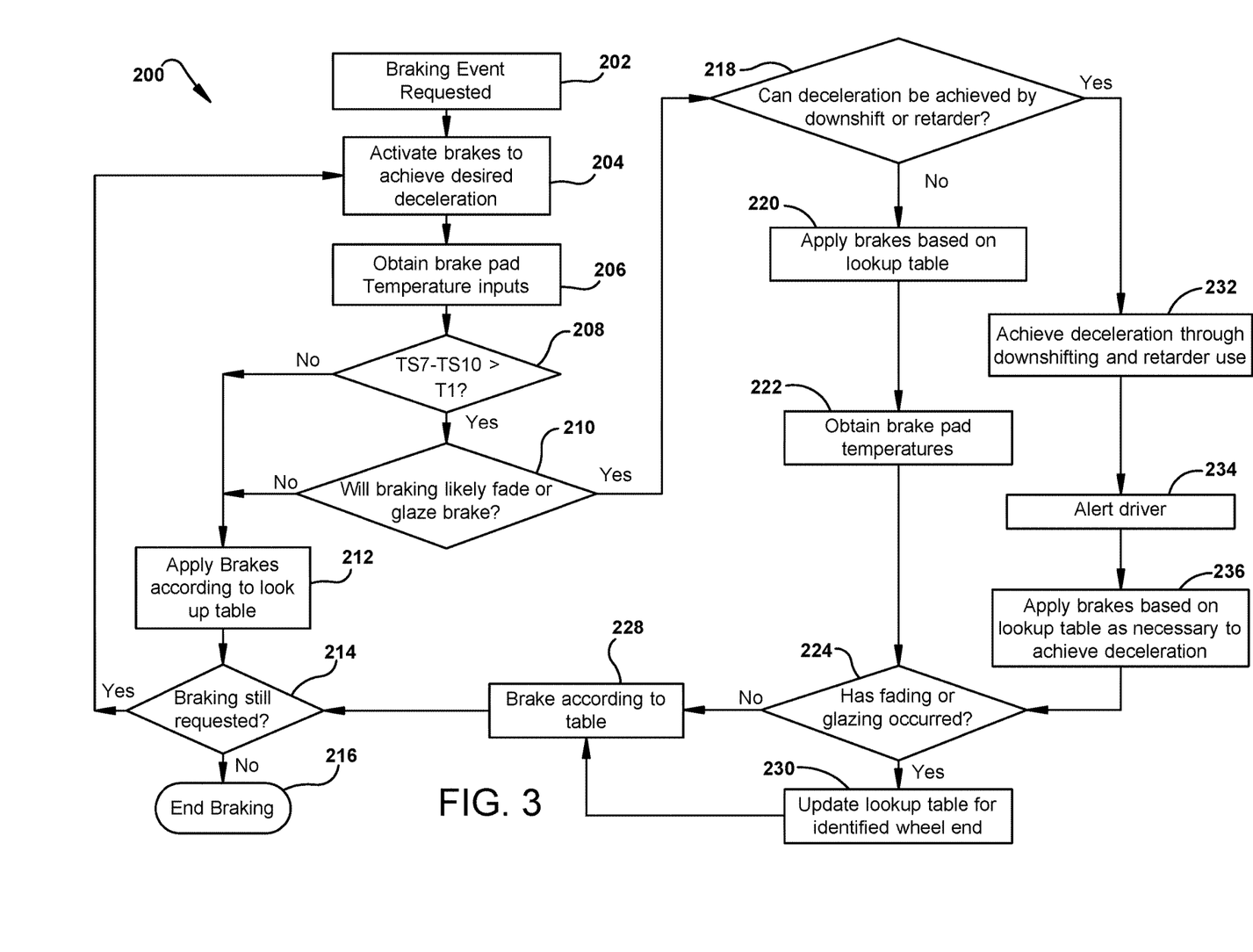
FIG. 3 illustrates a method of determining and responding to a potential glazed brake pad or brake fade when a braking event is requested.

If the brake temperature sensors TS7-TS10 are instead increasing, the method 100 moves to step 112 to determine if the service brakes are being applied. If the service brakes are being applied, either manually by the driver or autonomously as determined by the trailer controller 50, a separate brake event algorithm, as shown as method 200 in FIG. 3, is initiated.

If the trailer control logic 52 determines that the service brakes are not being applied, the method 100 moves to step 116.

In step 116, the wheel speed of the trailer axle is compared to the wheel speed of the tractor axle(s). The trailer controller 50 receives the tractor wheel speed information from the tractor controller 14 via the communications line 42. If the wheel speed is relatively the same between the tractor and the trailer, then the method 100 proceeds to step 114 to continue to wait for the next brake event. If the wheel speed between the tractor axle(s) and trailer axle is different, for example a difference of greater than about 10%, then the method 100 proceeds to step 118.

If all of the TS7-TS10 brake pad temperatures are increasing and the wheel speeds are different between the tractor and the trailer, brake drag at the trailer is identified. If only a single brake pad temperature, such as TS7, or two brake pad temperatures on the same axle, such as TS7 and TS8 are increasing, as determined in step 110, a locked axle or brake is identified.

In step 119, the parking brake is again attempted to be released through electronic control. Also in step 119, the individual trailer service brake associated with the temperature sensor having the highest temperature value is attempted to be released through means such as increasing pressure at that wheel end or a brief brake apply. In one example, brake controller BC7 may be cycled to ensure that no air is trapped in the brake actuator. In step 120, the method 100 determines whether the brake was successfully released. If the trailer brake associated with the higher temperature brake pad is successfully released, meaning the wheel speed increase matches speed at other wheel ends, or the temperature at the identified wheel end decreases in temperature, then the method 100 proceeds to step 114 to wait for the next brake event.

If the trailer brake drag or locked wheel continues because the trailer brake(s) cannot be released, then the method 100 proceeds to step 122 where the driver is alerted and a brake drag event or locked wheel flag is set. In some instances, the trailer controller 50 may set itself in a limp home mode, which will limit some functionality of the vehicle due to the locked wheel or brake drag event. For example, the trailer controller 50 may transmit a message to the tractor controller 14 to request a throttle limit message be sent to the engine controller 70 so as to limit the maximum speed of the vehicle when in the limp home mode. The ABS warning light in the tractor may be illuminated. An audible warning may also be given to the driver. A message may be displayed on a driver information unit regarding the trailer brake drag.

In step 124, the temperature threshold for enabling retarder braking is lowered. For example, the first temperature threshold T1 at which retarder action may begin may originally have been set at 400 F. The first temperature threshold T1 may be reduced to 350 F, for example. In other words, the trailer controller 50 will request the retarder to contribute to the braking of the vehicle when the measured temperature from any one of TS7-TS10 is at a lower temperature than what was originally predetermined as T1 when the method 100 began. The control logic 52 will send a message to the tractor controller 14, which will relay the message to engine controller 70 to activate the retarder accordingly.

In step 126, the brake efficiency and performance tables will be updated with the information indicating the location of the locked wheel or dragging brake. For example, additional pressure may be applied to meet stopping distance requirements for the hotter wheel end. The updated brake efficiency and performance tables will be used to support future braking actions.

Therefore, a method for modifying a brake application on a trailer of a combination vehicle comprises receiving a temperature signal representative of a temperature of a first brake pad associated with a first brake assembly on a first axle of a trailer; receiving a temperature signal representative of a temperature of a second brake pad associated with a second brake assembly on the first axle of the trailer; comparing the first and second brake pad temperatures to a first predetermined temperature; determining if service brakes of the trailer are being applied by a driver; comparing a wheel speed of the trailer with the wheel speed of a tractor of the combination vehicle; determining a brake drag exists on the trailer in response to both the first and the second brake pad temperature being greater than the first predetermined temperature, the trailer wheel speed being less than the tractor wheel speed and the service brakes not being applied by the driver; and transmitting an alert signal to alert the driver to the presence of brake drag.

FIG. 3 illustrates the brake event method 200 of determining and responding to a potential glazed brake pad or brake fade on a tractor or trailer of a combination vehicle when a brake event is requested. A braking event request begins in step 202. The braking request may be from an automated braking system or from a driver. The desired deceleration is determined from the force applied by the driver on the brake pedal or from the electronic system requesting the braking event. In step 206, the input signals from the temperature sensors TS7-TS10 of the trailer brake system 12 are received. In step 208, the control logic 52 compares the temperatures values received to a look up table stored in the control logic 52.

The look up table for a drum brake equipped air brake system may be as shown in Table 1.

TABLE 1

| Temperature of any one brake pad | Braking Response |
|---|---|
| Ambient to ½ value of T1 | Normal |
| ½ value of T1 to T1 | Normal - monitor temperature sensors more frequently |
| T1 to T2 | Increase retarder assistance to support service braking |
| Above T2 | Fading of this wheel end brake assembly is likely begun. Identify the brake assembly as having reduced performance. Begin to increase braking at other wheel ends. |

The look up table for a disc brake equipped air brake system may be as shown in Table 2.

TABLE 2

| Temperature of any one brake pad | Braking Response |
|---|---|
| Ambient to ½ T1 | Normal |
| ½ T1 to T1 | Normal - monitor temperature sensors more frequently |
| T1 to T3 | Increase retarder assistance to support service braking |

TABLE 2-continued

| Temperature of any one brake pad | Braking Response |
| --- | --- |
| Above T3 | Glazing of brake pad at this wheel end is likely. Begin to increase braking at other wheel ends. Identify the brake assembly as having reduced performance. |

If the temperature values received from TS7-TS10 are about half the value of the first temperature threshold T1, the no changes are made. If the temperature values are between about half the value of the first temperature threshold T1 and T1, then the temperature sensors TS7-TS10 may be monitored more frequently as the rising temperature may be indicative of a future problem. If the temperature values remain below T1, then the method 200 moves to step 212. The control logic 52 applies the brakes according to look up table in step 212. If brakes are still being requested as in step 214, then the method 200 returns to step 204. If braking is no longer requested, then the method 200 ends the braking at step 216.

In one example, on a brake that is already determined to have reached T3, the retarder may be actuated when that particular brake reaches a temperature a factor lower than T1, since the state of that brake has already been recorded as "potentially glazed." In order to support the glazed brake, the other brakes in the system may be allowed to reach a temperature a factor above T1 before the retarder is actuated. The status of a brake as "potentially glazed" remains with that brake until the control logic 52 is reset after a brake change. If brakes are still being requested as in step 214, then the method 200 returns to step 204. If braking is no longer requested, then the method 200 ends the braking at step 216.

If the braking required to achieve deceleration determine in step 204 is determined to possibly cause glazing of the brakes due to the temperature values from TS7-TS10 nearing, but not exceeding, the third temperature threshold T3 or fading of the brakes due to nearing the second temperature threshold as determined in step 210, the method 200 proceeds to step 218. In step 218, the trailer control logic 52 determines if the deceleration request can be accomplished via a transmission downshift or via application of the engine retarder. If the deceleration request cannot be accomplished in this manner, the brakes are still applied based on the lookup table as in step 220. In step 222, the brake pad temperature from TS7-TS10 is analyzed again. In step 224, each brake pad temperature value is compared with a predetermined temperature value according to Table 1 or Table 2.

If the second temperature threshold T2 or third temperature threshold T3 has been reached as determined in step 224, the method 200 proceeds to step 230 to update lookup table to indicate that particular wheel end brake pad is glazed or faded. For example, if TS7 is installed on an air disc brake assembly. If the temperature value of TS7 sensor exceeds 1100 F, then the brake pad associated with TS7 is determined to likely be glazed. In response, the trailer controller 50 may begin in the modified braking setup in step 228. The braking may be modified by applying greater pressure at different wheel ends to achieve higher braking efficiency. For example, if the wheel end brake assembly associated with TS8 has never reached the third temperature threshold T3, the trailer controller 50 will send a brake signal to BC8 for a normal brake apply when a brake activation is requested. However, since the brake pad associated with TC7 has been determined to likely be glazed, then the trailer controller 50 may set this brake assembly as only 82% efficient. In this manner, the trailer controller 50 will transmit brake control signals to apply more brake pressure to that wheel end via BC7 to improve the brake efficiency. This 82% efficiency value will be assigned to the brake assembly associated with TC7 and be used in future braking calculations.

The method 200 continues to step 214 to determine if braking is still being requested. If braking is being requested the method 200 goes back to step 204 and uses the updated look up tables. If braking is no longer being requested, the method 200 ends the braking in step 216.

If the second temperature threshold T2 or third threshold temperature T3 has not been reached in step 224, the lookup table is not modified. Braking will be done according to the existing table in step 228. The method 200 continues to step 214 to determine if braking is still being requested. If braking is being requested the method goes back to step 204 and uses the updated look up tables. If braking is no longer being requested, the method 200 ends the braking in step 216.

If, in step 218, the control logic 52 determines that the deceleration can be accomplished or supplemented by the transmission downshift or activation of the retarder, the method 200 proceeds to step 232. In step 232, the deceleration is equivocated to a transmission downshift and retarder activation. The trailer controller 50 will send a message to the tractor controller 14 via the communications line 42. In step 228, the tractor controller 14 will respond by transmitting a message to the engine controller 70 to actuate the retarder and/or transmitting a message to the transmission controller 74 to downshift. In step 234, the driver will be alerted to the assistive deceleration of the retarder or transmission.

However, the service brakes may still need to be applied in step 236 to achieve the desired deceleration, but at a rate that may not cause additional fading or glazing, or fading or glazing of other brake assemblies. The method 200 continues to step 224 to determine if glazing or fading has occurred.

If the second temperature threshold T2 or the third temperature threshold T3 has been reached, the method 200 proceeds to step 230 to update lookup table to indicate that particular wheel end brake pad associated with the temperature value is glazed or faded. In response, the braking may begin in the modified braking setup in step 228 according to the new look up table. The method 200 continues to step 214 to determine if braking is still being requested. If braking is being requested, the method 200 returns to step 204 and uses the updated look up tables. If braking is no longer being requested, the method 200 ends the braking in step 216.

If the second temperature threshold T2 or third temperature threshold T3 has not been reached in step 224, braking will be achieved according to the new table in step 228. The method 200 continues to step 214 to determine if braking is still being requested. If braking is being requested, the method 200 goes back to step 204 and uses the updated look up tables. If braking is no longer being requested, the method 200 ends the braking in step 216.

Figure 4:
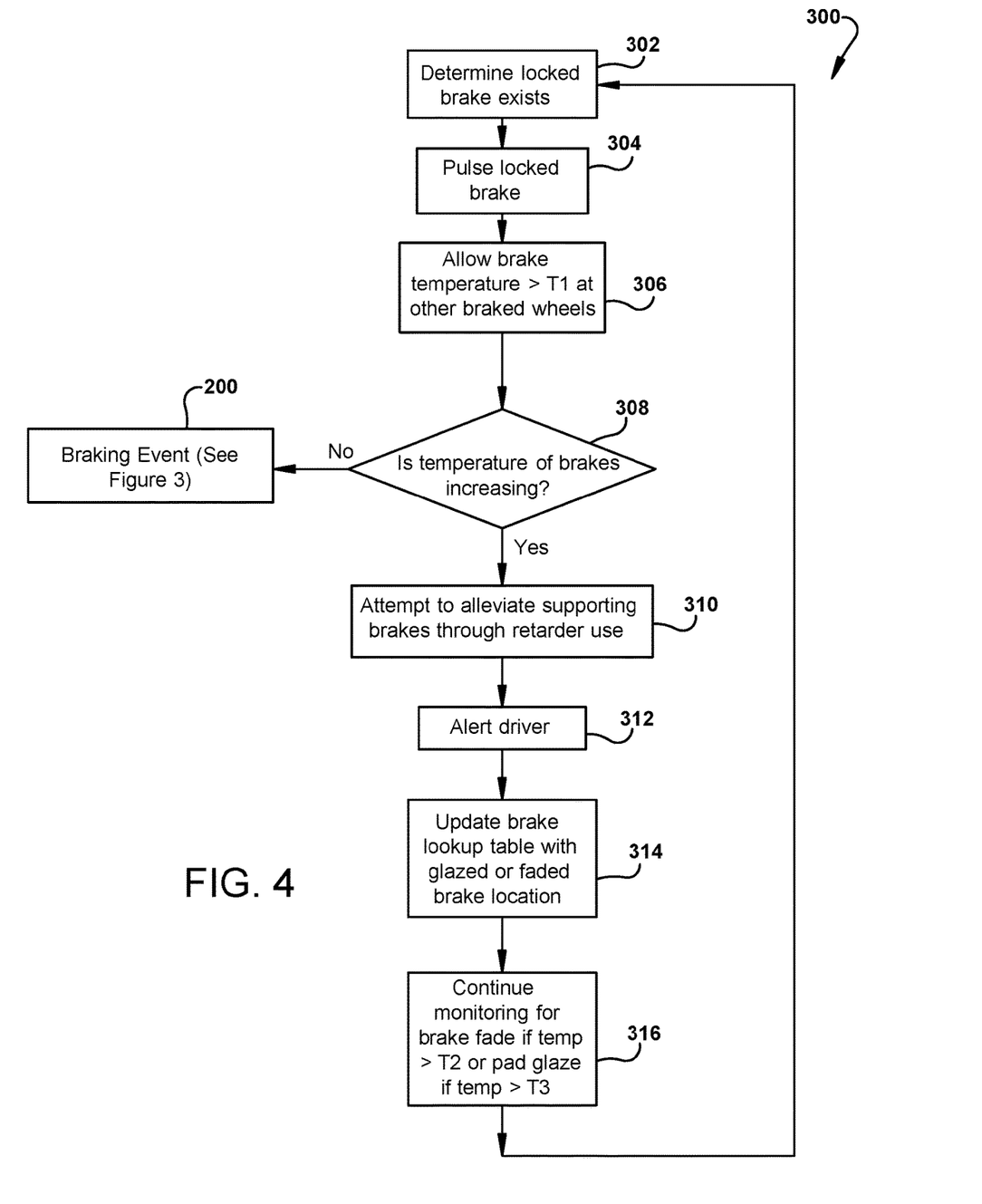
FIG. 4 illustrates a method of balancing brake temperature, according to one example of the present invention.

FIG. 4 illustrates a method 300 of balancing brake temperature. In step 302, the method 300 determines a locked brake or brakes exist. In step 304, the trailer controller 50 will transmit a brake control signal to the brake control device associated with the locked brake. The brake control signal will pulse the brakes at the wheel end in an attempt to loosen the brake assembly from the locked state.

In step 306, the trailer controller 50 allows an increase in brake temperature above the first temperature threshold T1 at the other non-locked brakes to help alleviate the locked brake(s) situation. In step 308, the temperatures of the remaining brakes are monitored to determine if they are increasing. If the temperatures are not increasing, the method 300 proceeds to method 200 as in FIG. 3. If the temperature continues to increase, the method 300 proceeds to step 310 to cause the retarder to contribute to deceleration. Alternatively, the trailer controller 50 will actuate other brakes further away from locked brake assembly. In step 312, the driver is alerted to possible glazing or fading of the brakes. In step 314, the brake efficiency and performance lookup table data is updated with the new information. In this manner, the trailer controller 50 keeps track of which brake has reached the second temperature threshold T2 that may have caused brake fade or reached the third temperature threshold T3 that may have caused brake glazing. The monitoring of the brake pad temperature continues as the method 300 returns to step 302.

Each of the methods 200 and 300 may be applied to the tractor braking system 10 as well as the trailer braking system 12.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method for modifying a brake application on a trailer of a combination vehicle comprising:
   receiving a temperature signal in a trailer controller representative of a temperature value of a first brake pad associated with a first brake assembly on a first axle of a trailer;
   receiving a temperature signal in the trailer controller representative of a temperature value of a second brake pad associated with a second brake assembly on the first axle of the trailer;
   comparing the first and second brake pad temperature values in the trailer controller to a predetermined first temperature threshold;
   determining in the trailer controller if service brakes of the trailer are being applied by a driver;
   comparing a wheel speed of the trailer with the wheel speed of a tractor of the combination vehicle as received by the trailer controller on a communications line between the trailer controller and a tractor controller;
   determining in the trailer controller that a brake drag exists on the trailer in response to both the first and the second brake pad temperature values being greater than the first temperature threshold, the trailer wheel speed being less than the tractor wheel speed and the service brakes not being applied by the driver; and
   transmitting an alert signal from the trailer controller to alert the driver to the presence of brake drag.

2. The method as in claim 1 further comprising:
   transmitting a signal to release the parking brakes on the trailer; and
   determining brake drag is still present in response to both the first and the second brake pad temperature values remaining greater than the first temperature threshold and the trailer wheel speed remaining less than the tractor wheel speed.

3. The method as in claim 1, further comprising: transmitting a signal to the engine to limit the throttle.

4. The method as in claim 1, wherein the predetermined first temperature threshold is about 400 F.

5. The method as in claim 1, wherein the first brake pad is one of an disc brake pad and a drum brake pad for a pneumatic braking system.

6. A method for modifying a brake application on a combination vehicle comprising:
   receiving a temperature signal in a trailer controller indicating a temperature value of at least one brake pad associated with at least one trailer brake assembly;
   comparing the temperature value of one of the at least one brake pad to a predetermined first temperature threshold in the trailer controller;
   determining in the trailer controller that the at least one trailer brake assembly is locked in response to the brake pad temperature value being above the first temperature threshold while the other of the at least one brake pad temperature signals remain lower than the first temperature threshold; and
   comparing the temperature value of the at least one brake pad to a predetermined second temperature threshold and changing a brake control signal to a brake control device associated with the at least one brake pad to increase pressure delivered to the brake assembly in response to the at least one brake pad temperature value exceeding the second temperature threshold.

7. The method as in claim 6, further comprising increasing the value of the first temperature threshold, wherein an other of the at least one brake pads reaches the increased first temperature threshold prior to activation of a retarder to decelerate the vehicle.

8. The method as in claim 6, further comprising activating a retarder on a tractor of the combination vehicle to assist the service brakes in slowing the combination vehicle.

9. The method as in claim 8, further comprising:
   lowering the predetermined first temperature threshold; and
   activating the retarder to support braking of the combination vehicle when the at least one brake pad temperature value exceeds the lowered first temperature threshold.

10. The method as in claim 6, wherein the predetermined second temperature threshold is about 600 F.

11. The method as in claim 6, further comprising updating a lookup table such that the brake control device associated with the at least one brake pad will receive higher brake pressure via brake control device than other brake control devices in response to the at least one brake pad temperature value exceeding the second temperature threshold.

12. The method as in claim 6, further comprising comparing the temperature value of the at least one brake pad to a predetermined third temperature threshold and updating a lookup table so that the brake assembly associated with the at least one brake pad receives higher pressure than other brake controllers on vehicle in response to the temperature value exceeding the third temperature threshold.

13. The method as in claim 12, wherein the third predetermined temperatures is about 1100 F.

* * * * *